United States Patent Office 3,411,869
Patented Nov. 19, 1968

3,411,869
METHOD OF PREPARING ANHYDROUS FERROUS HALIDES
Kenneth B. Bradley, Midland, Mich., and Alton W. Long, Lucas, Ohio, assignors to The Dow Chemical Company, Midland, Mich., a corporation of Delaware
No Drawing. Filed Jan. 28, 1966, Ser. No. 536,230
10 Claims. (Cl. 23—87)

ABSTRACT OF THE DISCLOSURE

Substantially anhydrous ferrous chloride, bromide or iodide can be prepared from either crystalline hydrates or aqueous solutions of these ferrous salts by heating in an inert organic which has a boiling point at least as high as the temperature at which the hydrates normally lose the final mole of water of hydration.

This invention relates to a method of making substantially anhydrous ferrous halides, in which the halide atom has an atomic weight of at least 34.45, and more particularly pertains to a method of making substantially anhydrous ferrous chlorides, bromides or iodides from aqueous solutions or crystalline hydrates of these ferrous salts, by heating in the presence of an inert organic diluent which can be a hydrocarbon, a halogenated hydrocarbon, a nitro substituted hydrocarbon or one containing both nitro and halogen substituents, and having a boiling point at least as high as the temperature at which the ferrous hydrates undergoing treatment normally lose the final mol of water of hydration.

Substantially anhydrous ferrous halides in which the halide has an atomic weight of at least 35.45 are useful as catalysts for chlorinating incompletely chlorinated halobenzenes to a higher state of chlorination. When used for this purpose, it is essential that the ferrous halides be in a relatively fine state of division, so that the catalyst can be dispersed throughout the entire liquid mass during the halogenation step.

Prior processes said to produce substantially anhydrous ferrous halides of the type described include (1) heating iron with the free halogen at temperatures of 800° C. or more, (2) heating iron with gaseous hydrogen halide to 800° C. or higher, (3) heating an oxide of iron with gaseous hydrogen halide at high temperatures, or (4) adding $NH_4Cl$ to $FeCl_2 \cdot 4H_2O$ and heating to decompose the hydrate and distill off $NH_4Cl$ and water. In the processes where iron or an oxide of iron is treated with halogen or a hydrogen halide, it is extremely difficult to obtain a ferrous halide of the purity desired because of the ease of formation of the ferric salt. In the process where $NH_4Cl$ is sublimed, it is difficult to prepare a ferrous chloride-ammonium chloride complex with only one mol of $NH_4Cl$. Also, the sublimation temperature is about 350° C. or higher, which is in the range at which $FeCl_2$ disproportionates to form $FeCl_3$ and Fe. Additionally, all the procedures suffer from the shortcoming of forming a granular mass, which requires comminution and screening for adequate particle size, under nonoxidizing conditions.

One of the most desirable ways of forming a ferrous halide is to heat iron with an aqueous haloacid or, in the case of the iodide, the iron can be heated with water and iodine. The product recovered by crystallization from a saturated solution or in drying at temperatures up to about 118° C., is a hydrate which can contain from 1 to 6 mols of water of hydration, usually 2 to 4 mols of water of hydration. The particle size of the crystals can be controlled to some degree, but the hydrate is not useful, per se, as a chlorination catalyst.

We have found that if an aqueous solution of a ferrous halide in which the halogen has an atomic weight of at least 35.45 is heated with hydrocarbon, a nitro substituted aromatic hydrocarbon, a ring halogenated hydrocarbon or a hydrocarbon having both halogen and nitro groups on a ring and having a boiling point of from about 175 to about 215° C., the free water and the water of hydration is removed from the ferrous halide with a minimal amount of disproportionation, hydrolysis or iron oxide formation. This is surprising because the temperature finally reached is usually considerably higher than that at which disproportionation and oxide formation is pronounced even under a high vacuum.

A further advantage is that the organic liquid used for the dehydration step can be the same as that which is to be halogenated. Thus, a slurry of catalyst in a fine uniform state of dispersion can be easily prepared and will require no further working before it is ready for use. The particles of ferrous halide produced in accordance with this invention have a coating of the organic ingredient on the surface and are thus protected from air and moisture if further handling or storage are desirable.

The inert organic diluents include but are not limited to saturated aliphatic hydrocarbons having from about 10 to 18 carbon atoms, alkyl substituted mononuclear aromatic hydrocarbons, derivatives containing two or more halogen atoms, two nitro groups or both a halogen and nitro group, polynuclear aromatic hydrocarbons, including those with fused and separate rings and alkyl and halogen substituted derivatives and polycycloalkyl hydrocarbons and their halogen substituted derivatives.

Representative diluents are decane, dodecane, hexadecane, octadecane, petroleum distillates with a boiling range of 170 to 250° C., propyl toluene, isopropyl toluene, the butyl benzenes, the butyl toluenes, the amyl benzenes, the dibutyl benzenes, di, tri and tetraethyl benzenes, tri and tetramethyl benzenes, cyclohexyl benzene, isohexyl benzene, the ethylbutyl and isobutyl benzenes, the ethylpropyl benzenes, biphenyl, diphenyl benzenes, naphthalene, tetrahydronaphthalene, decahydronapthalene, fluorene, phenalene, anthracene, phenanthrene, dihalobenzenes, trihalobenzenes, monohalo mononitro benzenes, mono and dihalogenated biphenyls, mono and dihalogenated naphthalenes and any mixture of the above compounds. The halogen on any of the aromatic or cycloaliphatic nuclei can be the same or different, i.e., fluorine, chlorine, bromine or iodine or any combination thereof. The only carbon to carbon unsaturation in the diluent is aromatic.

In the dehydration step at atmospheric pressure, the free water and loosely bound water of crystallization usually distill off at about 97–100° C. The water in what appears to be the dihydrate of the ferrous salt appears to be considerably more strongly bound, because approximately one mol of water distills off after a temperature somewhat higher than 100° C. is reached. The final mol of water crystallization appears to require even more drastic heating conditions. This portion of the water is not removed from the salt until a temperature above 150° C. at atmospheric pressure is reached. Usually, a temperature of from about 165–195° C. is needed, depending primarily on the salt undergoing dehydration.

The process of this invention is operable under reduced or under pressure greater than atmospheric, provided that the mixture is heated to at least the point at which the monohydrate of the ferrous salt loses its water of hydration under the pressure conditions which pervail. For our purposes, it is preferred to operate under atmospheric pressure.

Although the amount of water present in the salt-water-diluent system is in no way critical, it is preferred to start with a water solution of salt approaching or greater than saturation, or by using hydrated crystals of the salt. Thus, the minimum amount of water will be that represented by one mol of water of crystallization per mol of ferrous salt.

In the examples which follow, all parts are by weight unless otherwise indicated.

Example I

A 35 weight percent solution of ferrous chloride was prepared by dissolving 199 g. (1 mol) of ferrous chloride tetrahydrate in 165 ml. water. This solution was added to a three-necked flask containing 1105 g. dichlorobenzene. The flask was equipped with a thermometer, a mechanical stirrer and a condenser connected to a decanter-separator. The mixture was slowly heated with good agitation. The bulk of the water (about 190 ml.) was removed at 98–100° C. head temperature. About 15 ml. water were collected when the head temperature rose to 135–141° C. and a third portion of about 20 ml. water was collected when the temperature was 171° C. Heating was discontinued when the head temperature reached 176° C., and the slurry was allowed to cool to 25° C. It was then filtered on a centrifuge through a filter cloth, using about 7 minutes spinning time.

The solids weighed 1157 g. and analyzed at follows:

| | Percent |
|---|---|
| $FeCl_2$ | 78.37 |
| $FeCl_3$ | 1.16 |
| FeO | 1.44 |
| Water | 1.62 | and the remainder, 17.59% was o-dichlorobenzene which adhered to the crystals. The latter were of small uniform particle size and easily dispersed in fresh dichlorobenzene. Trichlorobenzene is equivalent to dichlorbenzene for preparing the anhydrous $FeCl_2$.

The original ferrous chloride tetrahydrate contained 65.36% $FeCl_2$, 0.2% $FeCl_3$ and 34.99% $H_2O$. For comparative purposes, a sample of the hydrate was dehylrated in a rotary cone vacuum dryer for 48 hours at 115–120° C. and 5–10 mm. Hg pressure. The resulting product consisted of nonuniform particles, mostly as aggregates. It contained 10.86% $FeCl_3$, 7.81% FeO, 5.08% water, with the balance being $FeCl_2$.

From these data, it is apparent that although the ferrous chloride was heated to 176° C. with the dichlorobenzene and to a maximum of 120° C. in the vacuum oven, the process of this invention produced less disproportionation and oxide formation, and greater water of hylration removal from the ferrous chloride. The use of the inert organic diluent has the added advantage of providing a ferrous halide in a form that is readily usable as a catalyst in halogenation reactions.

Example II

Ferrous iodide was prepared by adding 300 ml. water to 126.9 g. $I_2$ and 55.85 g. of iron powder in a 1 liter flask of the type described in Example I. About 500 ml. decalin (decahydronaphthalene) were added to the mixture and stirred. When the reaction between the iodine and iron power was complete, the entire mixture was heated. The major portion of the water was azeotroped at a temperature of about 100° C. Heating was continued for about 3½ hours to a pot temperature of 191° C. During this step, additional water was removed as an azeotrope with the decalin. The mixture aws allowed to cool to 25° C. and filtered. The wet crystals weighed 164 g. On analysis, it was found that the crystals contained 83.48% $FeI_2$, .3% water, 1.12% FeO and a maximum of .01% free iodine. The balance was decalin.

The crystalline material was of uniform, finely divided particle size and could be used without further treatment as a halogenation catalyst.

Ferrous bromide can be made in the same manner using either an aqueous solution of the salt or a hydrate containing any number of mols of water of crystallization.

In place of the diluents employed in the specific examples, other inert organic compounds which have a boiling point at least as high as the temperature at which the ferrous halide hydrates lose their water of hydration can be used.

We claim:

1. a method of preparing substantially andydrous ferrous halide salts of the group consisting of ferrous chloride, bromide or iodide comprising heating a mixture of an inert organic diluent and said ferrous halide salt containing at least one mol of water, which can be water of crystallization, per mol of said ferrous salt to a temperature above 150° C. and up to about 195° C. to remove the water of hydration from the said ferrous halide molecule.

2. A method of claim 1 in which the salt is ferrous chloride.

3. The method of claim 1 in which the salt is ferrous bromide.

4. The method of claim 1 in which the diluent is a halogenated monocyclic hydrocarborn having at least two halogen atoms on the ring.

5. The method of claim 4 in which the diluent is a dichlorobenzene.

6. The method of claim 1 in which the diluent is a hydrocarbon in which the only carbon to carbon unsaturation is aromatic.

7. The method of making substantially anhydrous ferrous halide salts of the group consisting of ferrous chloride, bromide or iodide, comprising heating a mixture of a dihalobenzene and a ferrous halide salt containing at least one mol of water per mol of said ferrous halide salt to a temperature at which water is split out of the monohydrate of said salt.

8. The method of claim 7 in which the halogen of the ferrous salt and dihalobenzene are the same.

9. The method of claim 6 in which the hydrocarbon is decahydronaphthalene.

10. The method of claim 1 in which the diluent is a chlorobenzene containing 2 to 3 chlorine atoms and the salt is a hydrated ferrous chloride and a temperature of at least 170° C. is reached.

References Cited

UNITED STATES PATENTS

| 1,938,461 | 12/1933 | Prutton | 23—87 |
| 2,719,074 | 9/1955 | Brace | 23—87 |

OTHER REFERENCES

Chem. Abstracts, vol. 52, #15, Aug. 10, 1958, page 13206.

OSCAR R. VERTIZ, *Primary Examiner.*

EDWARD STERN, *Assistant Examiner.*